(12) United States Patent
Derkx (10) Patent No.: US 9,025,415 B2
(45) Date of Patent: May 5, 2015

(54) AUDIO SOURCE LOCALIZATION (75) Inventor: Rene Martinus Maria Derkx, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 367 days.

(21) Appl. No.: 13/521,244

(22) PCT Filed: Feb. 16, 2011

(86) PCT No.: PCT/IB2011/050643
§ 371 (c)(1),
(2), (4) Date: Jul. 10, 2012

(87) PCT Pub. No.: WO2011/104655
PCT Pub. Date: Sep. 1, 2011

(65) Prior Publication Data
US 2013/0128701 A1 May 23, 2013

(30) Foreign Application Priority Data
Feb. 23, 2010 (EP) .................................... 10154387

(51) Int. Cl.
*G01S 3/803* (2006.01)
*H04R 3/00* (2006.01)

(52) U.S. Cl.
CPC ................ *G01S 3/803* (2013.01); *G01S 3/8036* (2013.01); *H04R 3/005* (2013.01)

(58) Field of Classification Search
CPC ........ G01S 3/8036; G01S 3/803; H04R 3/005
USPC .................................................. 367/129, 118
See application file for complete search history.

(56) References Cited

U.S. PATENT DOCUMENTS 4,198,705 A * 4/1980 Massa ........................... 367/126
4,305,141 A * 12/1981 Massa ........................... 367/105
(Continued)

FOREIGN PATENT DOCUMENTS

CN 102804809 A * 11/2012
EP 1455552 A2 9/2004
(Continued)

OTHER PUBLICATIONS

Elko et al: "Second-Order Differential Adaptive Microphone Array"; IEEE International Conference on Acoustics, Speech and Signal Processing, ICASSP 2009, pp. 73-76.
(Continued)

*Primary Examiner* — Daniel Pihulic (57) ABSTRACT

An audio source localization apparatus receives signals from a microphone array (101), and a reference processor (105) generates at least three reference beams with different directional properties. An estimation processor (107) which generates simultaneous direction estimates for two sound sources, comprises a circuit (401) combining signals of the at least three reference beams with a beam shape parameter reflecting a shape of an audio beamform and a beam direction parameter reflecting a direction of an audio beamform for the combined signal. A cost processor (403) generates a cost measure indicative of an energy of the combined signal and a minimization processor (405) estimates values of the beam shape parameter and the beam direction parameter which correspond to a local minimum of the cost measure. A direction processor (407) then determines simultaneous direction estimates for two sound sources from the determined parameter values. Improved direction estimation for two simultaneous sound sources may be achieved.

15 Claims, 5 Drawing Sheets

(56) References Cited

U.S. PATENT DOCUMENTS

| | | | |
|---|---|---|---|
| 6,449,216 B1 * | 9/2002 | Roeck | 367/124 |
| 2003/0016588 A1 * | 1/2003 | Roeck | 367/124 |
| 2006/0140417 A1 | 6/2006 | Zurek | |
| 2009/0103749 A1 | 4/2009 | Goodwin | |
| 2013/0128701 A1 * | 5/2013 | Derkx | 367/129 |

FOREIGN PATENT DOCUMENTS

| | | |
|---|---|---|
| EP | 2540094 A1 * | 1/2013 |
| WO | 2006110230 A1 | 10/2006 |
| WO | 2009034524 A1 | 3/2009 |
| WO | WO 2011104655 A1 * | 9/2011 |

OTHER PUBLICATIONS

Takada et al: "Sound Source Separation Using Null-Beamforming and Spectral Subtraction for Mobile Devices"; 2007 IEEE Workshop on Applications of Signal Processing to Audio and Acoustics; pp. 30-33.

Takada et al: "Speech Enhancement Using Square Microphone Array for Mobile Devices"; IEEE International Conference on Acoustics, Speech and Signal Processing, ICASSP 2008, pp. 313-316.

Nagata et al: "Two-Channel Adaptive Microphone Array With Target Tracking"; Electronics and Communications in Japan, Part 3, vol. 83, No. 12, 2000, pp. 860-866.

R. Derkx: "First-Order Adaptive Azimutal Null-Steering for the Suppression of Two Directional Interferers"; Hindawi Publishing Corporation, EURASIP Journal on Advances in Signal Processing, vol. 2010, Article ID 230864, 16 Pages.

R. Derkx: "Optimal Azimuthal Steering of a First-Order Superdirectional Microphone Response"; Proceedings of the 11th International Workshop on Acoustic Echo and Noise Control, Seattle, WA, Sep. 2008, 4 Pages.

* cited by examiner

AUDIO SOURCE LOCALIZATION

FIELD OF THE INVENTION

The invention relates to audio source localization and in particular, but not exclusively, to audio source localization using microphone arrays with three or four microphones to determine directions of a plurality of sound sources.

BACKGROUND OF THE INVENTION

Advanced processing of audio signals has become increasingly important in many areas including e.g. telecommunication, content distribution etc. For example, in some applications, such as hands-free communication and voice control systems, complex processing of inputs from a plurality of microphones has been used to provide a configurable directional sensitivity for a microphone array comprising the microphones. As another example, a tele-conferencing application may use audio beam steering to select and isolate speakers. Specifically, the processing of signals from a microphone array can generate an audio beam with a direction that can be changed simply by changing the characteristics of the combination of the individual microphone signals.

An increasingly important function in advanced audio processing applications is the estimation of a position of various sound sources. Indeed, as audio processing is becoming used in increasingly complex audio environments, it is often desirable to be able to estimate directions of two simultaneous sound sources. For example, in a tele-conferencing scenario, two speakers may be simultaneously active. Such direction estimates may for example be used to direct audio beams in the desired directions or to provide notches in directions corresponding to interfering sound sources. In some scenarios sound source separation may be important and may be based on estimated directions of the two sound sources.

However, it is typically substantially more difficult to estimate directions for two simultaneous sound sources than estimating a direction for a single dominant sound source. A critical problem in such applications is that of how to separate the contributions from the different sound sources in the different microphone signals. Conventional solutions tend to be based on differentiating between the signals based on differences in time or frequency characteristics of the two signals. For example, if it is known that one of the two sound sources will be dominant in certain time intervals, the direction estimate for this sound source may only be generated during such time intervals. Another approach is to exploit frequency differences between the two sound sources. For example, a Fast Fourier Transform (FFT) may be applied to the signals and it may be assumed that one of the sound sources will be dominant in each subband. Accordingly, a single direction estimate may be generated for each subband and the direction estimates may be generated by averaging the subbands belonging to each sound source.

However, such approaches tend to be suboptimal or unreliable in many scenarios. In particular, the approaches rely on the two sound source audio signals having significant temporal or frequency differences and therefore tend to break down for signals that have similar characteristics. Even for relatively different audio signals, a significant degradation may occur as it may be difficult to determine which audio signal is dominant in each frequency and/or time interval. For example, even for different audio signals, the assumption of one sound source being dominant in each subband may only be appropriate for a low proportion of the subbands. Furthermore, conventional sound source localization approaches tend to be complex and resource demanding.

Hence, an improved approach for audio source localization would be advantageous and in particular an approach allowing improved accuracy, reduced sensitivity to similar characteristics of audio signals, increased flexibility, facilitated implementation, reduced resource consumption, improved performance for different operating scenarios and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided audio source localization apparatus comprising: a receiving circuit for receiving signals from an at least two-dimensional microphone array comprising at least three microphones; a reference circuit for generating at least three reference beams from the microphone signals, the three reference beams having different directional properties; and an estimation circuit for generating a simultaneous direction estimate for two sound sources, the estimation circuit comprising: a circuit for generating a combined signal by combining signals of the at least three reference beams, the combination having a beam shape parameter reflecting a shape of an audio beamform for the combined signal and a beam direction parameter reflecting a direction of an audio beamform for the combined signal, a circuit for generating a cost measure indicative of an energy measure of the combined signal, a circuit for estimating a beam shape parameter value for the beam shape parameter and a beam direction parameter value for the beam direction parameter corresponding to a local minimum for the cost measure, and a circuit for determining a first direction estimate of a first sound source and a second direction estimate for a second sound source as functions of the beam shape parameter value and the beam direction parameter value.

The invention may provide improved sound source localization for two simultaneous sound sources in many scenarios and applications. The determination of the two direction estimates may be more accurate in many scenarios. In particular, the approach may provide a reduced sensitivity to similarities in the audio from the two sound sources. Specifically, the approach may allow a determination of the directions based on spatial characteristics, and thus may allow directions to be determined even for audio signals from the two sound sources having very similar characteristics. Furthermore, the approach may be implemented with low complexity and/or with low computational resource requirements.

The approach may be particularly suitable for systems wherein the wavelength of the audio signals is substantially larger than the size of the microphone array.

The reference beams may be non-adaptive and may be independent of the captured signals and/or the audio conditions. The reference beams may be constant and may be generated by a constant/non-adaptive combination of the signals from the at least three microphones. The reference beams may specifically be Eigenbeams or orthogonal beams. One reference beam may be a monopole and the remaining reference beams may be dipoles. The dipoles may be substantially orthogonal.

The beam shape parameter may represent a relative weighting of directional reference beams relative to a non-directional reference beam. The beam direction parameter may represent a relative weighting of different directional reference beams. The different directional characteristics of the reference beams may reflect different beam shapes and/or different beam directions, e.g. as measured by a main gain direction or a mean direction of a main lobe.

In accordance with an optional feature of the invention, the estimation circuit is arranged to iteratively determine an update value for at least a first parameter of the beam shape parameter and the beam direction parameter in response to the combined signal, a current value of the beam shape parameter and a current value of the beam direction parameter, and to generate a new value for the first parameter from the update value and a current value of the first parameter.

This may provide facilitated implementation and/or reduced complexity while maintaining high performance. Specifically, it may reduce computational resource usage. It may furthermore allow a practical system for tracking movements of the sound sources.

In accordance with an optional feature of the invention, the update value is dependent on a derivative value of the cost measure with respect to the first parameter.

This may provide an improved determination of the beam shape parameter value and the beam direction parameter value. In particular, it may allow an efficient determination of the appropriate sign of the update value and may in some embodiments provide an advantageous determination of a suitable magnitude of the update value.

In accordance with an optional feature of the invention, the estimation circuit is arranged to independently determine update values for both the beam shape parameter and the beam direction parameter.

This may provide a more efficient and/or improved updating of the beam shape parameter value and the beam direction parameter value. The determinations may be independent in that the update value in the current iteration for one of the parameters is not dependent on the update value of the current iteration for the other parameter.

In accordance with an optional feature of the invention, the estimation circuit is arranged to estimate the local minimum using a gradient search process for at least one of the beam shape parameter and the beam direction parameter.

This may provide facilitated implementation and/or reduced complexity while maintaining high performance. Specifically, it may reduce computational resource usage. It may furthermore allow a practical system for tracking movements of the sound sources.

In accordance with an optional feature of the invention, the estimation circuit is arranged to limit the beam shape parameter to a reduced operating interval corresponding to a maximum weighting of a first reference beam of the at least three reference beams being smaller than a combined weighting of a second and third reference beam of the at least three reference beams.

This may provide improved determination of the first and second direction estimates.

In accordance with an optional feature of the invention, the first direction estimate and the second direction estimate are two-dimensional direction estimates in a plane and the estimation circuit is arranged to compensate the first direction estimate and the second direction estimates for an elevation of the source outside the plane.

This may provide improved determination of the first and second direction estimates. The compensation may for example be based on an assumed and/or predetermined elevation value of the sound sources above the plane.

In accordance with an optional feature of the invention, the microphone array is a three-dimensional microphone array comprising at least four microphones; the reference circuit is arranged to further generate a fourth reference beam and the estimation circuit further comprises: a circuit for generating a further combined signal by combining signals of the fourth reference beam and at least two other reference beams of the at least three reference beams, the combination having a further beam shape parameter reflecting a shape of an audio beamform for the further combined signal and a further beam direction parameter reflecting a direction of a further audio beamform for the further combined signal, a circuit for generating a further cost measure indicative of an energy measure of the further combined signal, a circuit for estimating a further beam shape parameter value for the further beam shape parameter and a further beam direction parameter value for the beam direction parameter corresponding to a local minimum for the further cost measure; and wherein the circuit for determining of the first direction estimate and the second direction estimate is arranged to further determine the first direction estimate and the second direction estimate in response to the further beam shape parameter value and the further beam direction parameter value.

This may allow more accurate direction estimates to be generated. In particular, it may allow three dimensional direction estimates to be generated and/or may allow more accurate two dimensional direction estimates to be generated as these may be compensated for an estimated elevation from the plane of the two dimensional direction estimates. The same approach for determining two directional estimates in one plane based on one set of reference beams may be used for determining two additional direction estimates in another, possibly perpendicular, plane using a different set of reference beams.

The fourth reference beam may specifically be a dipole and may be orthogonal to other dipoles of the reference beams.

In accordance with an optional feature of the invention, the beam shape parameter value and the beam direction parameter value characterize a first set of three-dimensional points for which a derivative of the cost measure with respect to at least one of the beam shape parameter and the beam direction parameter is zero; and the further beam shape parameter value and the further beam direction parameter characterize a second set of three-dimensional points for which a derivative of the further cost measure with respect to at least one of the further beam shape parameter and the further beam direction parameter is zero; and wherein the estimation circuit is arranged to determine the first direction estimate and the second direction estimate as direction estimates for at least two three-dimensional points comprised in both the first set of three-dimensional points and the second set of three-dimensional points.

This may allow for an accurate and/or low complexity determination of three dimensional direction estimates.

In accordance with an optional feature of the invention, the estimation circuit is arranged to select the at least two three-dimensional points in response to a requirement that the at least two three-dimensional points correspond to a predetermined gain value.

This may allow for an accurate and/or low complexity determination of three dimensional direction estimates. The predetermined gain value may specifically correspond to a normalized gain value and the two three-dimensional points may be selected as those points belonging to both sets of three dimensional points, and to a unit sphere.

In accordance with an optional feature of the invention, the estimation circuit is arranged to determine the first direction estimate and the second direction estimate as direction estimates which for the beam shape parameter value and the beam direction parameter value correspond to an analytical derivative of the cost function with respect to at least one of the beam shape parameter and the beam direction parameter being zero.

This may allow an advantageous determination of directions of two simultaneous sound sources by exploiting the practical algorithmic minimization of a signal value with analytical knowledge of an associated cost function. The invention may exploit the practical and analytical implications of a cost function related to an energy measure of a combined signal to provide resource efficient calculation of direction estimates for two simultaneous sound sources.

The direction estimates may be determined under the criterion that both the derivative with respect to the beam shape parameter and the derivative with respect to the beam direction parameter are zero.

In accordance with an optional feature of the invention, a first reference beam of the at least three reference beams is a monopole and at least a second reference beam and a third reference beam of the at least three reference beams are differently directed dipoles.

This may provide particularly advantageous performance and may allow an efficient and accurate determination of direction estimates for two simultaneous direction estimates based only on spatial considerations. The second and third reference beams may be orthogonal.

In accordance with an optional feature of the invention, the beam direction parameter reflects a weighting of the second reference beam relative to the third reference beam, and the beam shape parameter reflects a weighting of the first reference beam relative to the second and third reference beams.

This may provide a particularly efficient generation of a combined signal which allows for a simplified analytical evaluation and which results in reduced complexity functions for determining the direction estimates from the beam shape parameter value and the beam direction parameter value.

In accordance with an optional feature of the invention, the combination is substantially given by:

$$y[k]=\alpha m[k]+(1-\alpha)[\cos(\phi_s)d_x[k]+\sin(\phi_s)d_y[k]]$$

where y[k] represents sample k of the combined signal, m[k] represents sample k of the first reference beam, $d_x[k]$ represents sample k of the second reference signal, $d_y[k]$ represents sample k of the third reference signal, $\alpha$ is the beam shape parameter and $\phi_s$ is the beam direction parameter.

This may provide particularly advantageous performance and may allow an efficient and accurate determination of direction estimates for two simultaneous direction estimates based on spatial considerations.

According to an aspect of the invention there is provided a method of audio source localization comprising: receiving signals from an at least two-dimensional microphone array comprising at least three microphones; generating at least three reference beams from the microphone signals, the three reference beams having different directional properties; and generating a simultaneous direction estimate for two sound sources by performing the steps of: generating a combined signal by combining signals of the at least three reference beams, the combination having a beam shape parameter reflecting a shape of an audio beamform for the combined signal and a beam direction parameter reflecting a direction of an audio beamform for the combined signal, generating a cost measure indicative of an energy measure of the combined signal, estimating a beam shape parameter value for the beam shape parameter and a beam direction parameter value for the beam direction parameter corresponding to a local minimum for the cost measure, and determining a first direction estimate of a first sound source and a second direction estimate for a second sound source as functions of the beam shape parameter value and the beam direction parameter value.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
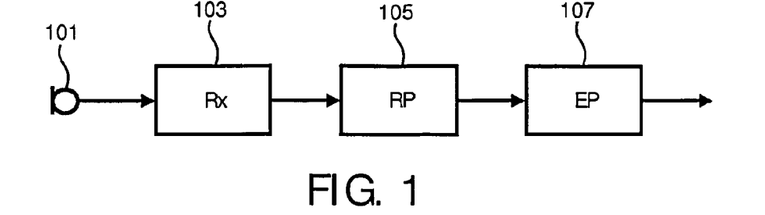
FIG. 1 illustrates an example of elements of an apparatus for sound source localization for two simultaneous sound sources in accordance with some embodiments of the invention.

FIG. 1 illustrates an example of an apparatus for sound source localization for two simultaneous sound sources in accordance with some embodiments of the invention. The system processes signals from a plurality of microphones to estimate directions from the microphones to two different and simultaneous sound sources. The direction estimates are determined on the basis of spatial considerations and do not rely on different temporal or spectral characteristics for the audio signals from the two sources.

The system of FIG. 1 comprises a microphone array 101 which in the specific example is a two-dimensional microphone array. The microphone array 101 comprises at least three microphones which are not arranged in a single one dimensional line. In most embodiments, the shortest distance from one microphone to a line going through two other microphones is at least a fifth of the distance between these two microphones.

Figure 2:
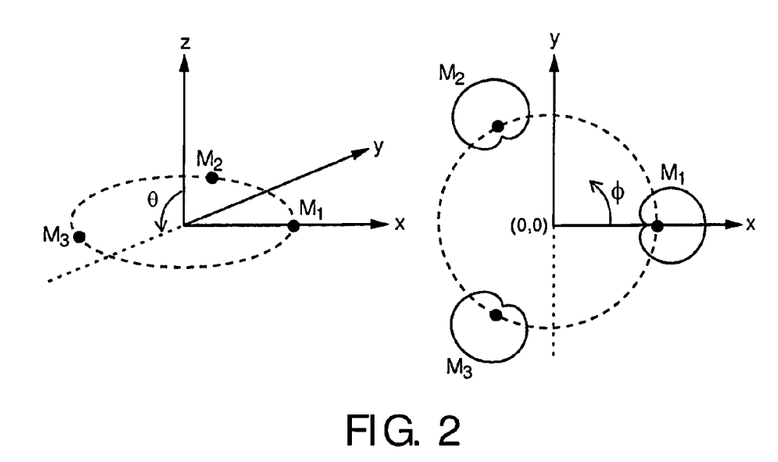
FIG. 2 illustrates an example of a microphone configuration for a microphone array.

In the specific example, the microphone array 101 comprises three microphones which are spaced uniformly on a circle as illustrated in FIG. 2.

Thus, in the example a circular array of at least three (omni- or uni-directional) sensors in a planar geometry is used. It will be appreciated that in other embodiments, other arrangements of the microphones may be used. It will also be appreciated that for embodiments wherein more than three microphones are used, these may possibly be arranged in a non-planar geometry, i.e. the microphone array may be a three dimensional microphone array. However, the following description will focus on a three microphone equidistant circular array arranged in the azimuth plane.

The microphone array 101 is coupled to a receiving circuit 103 which receives the microphone signals. In the example of FIG. 1, the receiving circuit 103 is arranged to amplify, filter and digitize the microphone signals as is well known to the skilled person.

The receiving circuit 103 is coupled to a reference processor 105 which is arranged to generate at least three reference beams from the microphone signals. The reference beams are constant beams that are not adapted but are generated by a fixed combination of the digitized microphone signals from the receiving circuit 103. In the example of FIG. 1, three orthogonal Eigenbeams are generated by the reference processor 105.

In the example, the three microphones of the microphone array are directional microphones and are specifically uni-directional cardioid microphones which are arranged such that the main gain is pointing outwardly from the perimeter formed by joining the positions of the microphones (and thus outwardly of the circle of the circular array in the specific example). The use of uni-directional cardioid microphones provides an advantage in that the sensitivity to sensor noise and sensor-mismatches is greatly reduced. However, it will be appreciated that in other scenarios other microphone types may be used, such as omni-directional microphones.

The responses of the three cardioid microphones are denoted as respectively $E_C^0(r,\theta,\phi)$, $E_C^1(r,\theta,\phi)$ and $E^{C2}(r,\theta,\phi)$ having their main-lobes at respectively $\Phi=0$, $2\pi/3$, $4\pi/3$, where $\theta$ and $\Phi$ are the standard spherical coordinate angles. Assuming that there is no sensor-noise, the n'th cardioid microphone response is ideally given by:

$$E_c^n(r, \theta, \phi) = A_n e^{j\psi_n}$$

The magnitude-response $A_n$ and phase-response $\psi_n$ of the n'th cardoid microphone is given by:

$$A_n = \frac{1}{2} + \frac{1}{2}\cos\left(\phi - \frac{2n\pi}{3}\right)\sin\theta,$$

with $$\psi_n = \frac{2\pi f}{c}\sin\theta(x_n\cos\phi + y_n\sin\phi).$$

In the above equations c is the speed of sound and $x_n$ and $y_n$ are the x and y coordinates of the n'th microphone.
Using:

$$x_n = r\cos\left(\phi - \frac{2n\pi}{3}\right),$$

and $$y_n = r\sin\left(\phi - \frac{2n\pi}{3}\right),$$

with r the radius of the circle we can write:

$$\psi_n = \frac{2\pi f}{c}r\sin\theta\cos\left(\frac{2n\pi}{3}\right).$$

From the three cardioid microphones, three orthogonal Eigenbeams can be generated using the 3-point Discrete Fourier Transform (DFT) with the three microphones as input. This DFT produces three phase modes $P_i(r,\theta,\phi)$ with i=1,2,3:

$$P_0(r, \theta, \phi) = \frac{1}{3}\sum_{n=0}^{2} E_c^n(r, \theta, \phi)$$

$$P_1(r, \theta, \phi) = [P_2(r, \theta, \phi)]^*$$

$$= \frac{1}{3}\sum_{n=0}^{2} E_c^n(r, \theta, \phi)e^{-j2\pi n/3},$$

with $j=\sqrt{-1}$ and * denoting the complex conjugate operator.

These functions can be used to generate three reference beams consisting in a monopole $$E_m(r, \theta, \phi) = 2 \cdot P_0(r, \theta, \phi),$$

and two orthogonal dipoles:

$$E_d^x(r, \theta, \phi) = 2 \cdot [P_1(r, \theta, \phi) + P_2(r, \theta, \phi)]$$

$$E_d^y(r, \theta, \phi) = 2j \cdot [P_1(r, \theta, \phi) - P_2(r, \theta, \phi)]$$

In matrix notation, this may be represented by $$\begin{bmatrix} E_m \\ E_d^x \\ E_d^y \end{bmatrix} = \frac{2}{3}\begin{bmatrix} 1 & 1 & 1 \\ 2 & -1 & -1 \\ 0 & \sqrt{3} & -\sqrt{3} \end{bmatrix}\begin{bmatrix} E_c^0 \\ E_c^1 \\ E_c^2 \end{bmatrix}.$$

For wavelengths larger than the size of the array, the phase component of the cardioid response can be ignored resulting in the following Eigenbeam responses:

$$E_m = 1$$

$$E_d^x(\theta, \phi) = \cos\phi \sin\theta$$

$$E_d^y(\theta, \phi) = \cos(\phi - \pi/2)\sin\theta.$$

Figure 3:
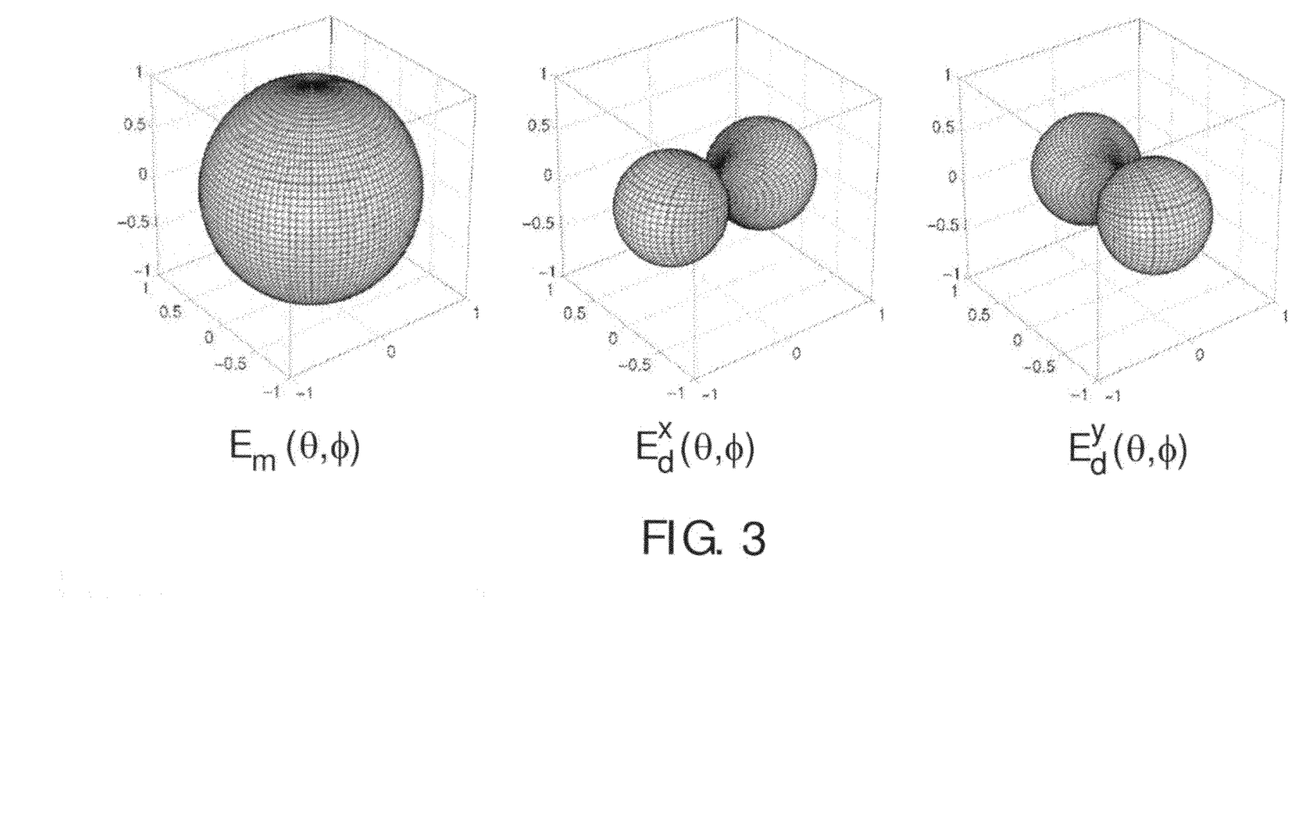
FIG. 3 illustrates an example of Eigenbeams generated by the apparatus of FIG. 1.

The directivity patterns of these Eigenbeams are illustrated in FIG. 3.

The zero'th-order Eigenbeam $E_m$ represents the monopole response corresponding to a sphere whereas the other Eigenbeams represent first order Eigenbeams corresponding to double spheres as illustrated in FIG. 3. Thus, the two first order Eigenbeams are orthogonal dipoles.

Thus, the reference processor 105 receives three input signals (in the form of three sample sequences) and generates three reference beams from these. The three reference beams have different directional characteristics within the example the first reference beam being substantially non-directional whereas the second and third reference beams are directional and have the same beam shape but are directed in different directions.

At each sample time, a signal sample is generated for each reference beam from the microphone signal samples. Thus, the following description considers time discrete (sampled) signals with a time index k. The reference processor 105 generates a monopole signal m[k] and two orthogonal dipole signals $d_x[k]$, $d_y[k]$ from the three cardioid microphone signals $c_0[k]$, $c_1[k]$, $c_2[k]$:

$$\begin{bmatrix} m[k] \\ d_x[k] \\ d_y[k] \end{bmatrix} = \frac{2}{3}\begin{bmatrix} 1 & 1 & 1 \\ 2 & -1 & -1 \\ 0 & \sqrt{3} & -\sqrt{3} \end{bmatrix}\begin{bmatrix} c_0[k] \\ c_1[k] \\ c_2[k] \end{bmatrix}.$$

It is noted that the processing required to generate the reference beam signals from the microphone signals is of low complexity and represents a low computational resource demand.

Figure 4:
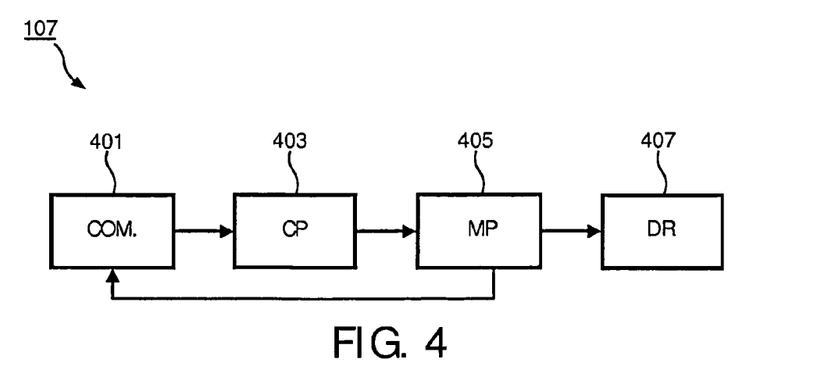
FIG. 4 illustrates an example of elements of a direction estimation processor for the apparatus of FIG. 1.

The three reference beam signals $m[k]$, $d_x[k]$, $d_y[k]$ are fed to an estimation processor 107 which is arranged to generate direction estimates for two simultaneous sound sources based on the reference beam signals. FIG. 4 illustrates elements of the estimation processor 107 in more detail and in accordance with some embodiments of the invention.

The estimation processor 107 comprises a combiner 401 which receives the reference beam signals $m[k]$, $d_x[k]$, $d_y[k]$ and combines these into a combined signal. The combination may simply be a weighted summation of the reference beam signals, i.e.

$$y[k] = z_1 \cdot m[k] + z_2 \cdot d_x[k] + z_3 \cdot d_y[k]$$

in the example where $d_x[k]$ and $d_y[k]$ correspond to directional reference beams whereas $m[k]$ corresponds to a non-directional reference beam, this may be rewritten as:

$$y[k] = z_1 \cdot m[k] + z_4 \cdot (z_5 \cdot d_x[k] + z_6 \cdot d_y[k])$$

where $z_4 \cdot z_5 = z_2$ and $z_4 \cdot z_6 = z_3$ and $z_5$ and $z_6$ are scalar values meeting the criterion $(z_5)^2 + (z_6)^2 = 1$. Thus, in the example $(z_4)^2 = (z_2)^2 + (z_3)^2$ and $z_5 = z_2/z_4$ and $z_6 = z_3/z_4$.

Therefore the specific example where the two directional reference beams are identical except for their directions, the parameters $z_5$ and $z_6$ control the direction of the main lobe, i.e. the direction of the largest gain of the audio beam formed by the combination of the two directional reference beams, as well as of the audio beam formed by the combination of the three reference beams. Furthermore, the shape of the resulting audio beam formed by the combination of the three reference beams is controlled by the parameters $z_1$ and $z_4$.

Thus, it can be seen that the weighted combination of the reference beams results in a(t least one) beam direction parameter and a(t least one) beam shape parameter which reflect/are indicative of the beam shape and direction of the combined beam respectively.

In the specific example, the combination is specifically represented by the combination of:

$$y[k] = \alpha \, m[k] + (1-\alpha) [\cos(\phi_s) d_x[k] + \sin(\phi_s) d_y[k]].$$

Thus, in the specific example $z_1 = \alpha$, $z_4 = 1-\alpha$, $z_5 = \cos(\phi_s)$ and $z_6 = \sin(\phi_s)$.

In the example where the second and third reference beams are unity gain dipoles, the summation in square brackets simply corresponds to the generation of a unity dipole in the direction of $\phi_s$. Furthermore, as the first reference beam is a unity monopole, the restriction on $z_1$ and $z_4$ ensures that the resulting audio beam is a unity gain audio beam. The shape of the audio beam is controller by the parameter $\alpha$. Specifically, for $\alpha=1$ the resulting audio beam is a unity monopole and for $\alpha=0$ the resulting beam is a unity dipole in the direction $\phi_s$.

Indeed, the resulting audio beam pattern is given as:

$$E_y(\theta, \phi) = \alpha + (1-\alpha) \cos(\phi - \phi_s) \sin(\theta),$$

where $\alpha$ is a beam shape parameter that controls the first-order beam pattern shape and $\phi_s$ is a beam direction parameter which rotates the beam pattern in the azimuthal plane.

Thus, in the example an explicit combination is made in response to a beam direction parameter $\phi_s$ which sets the weighting of the second reference beam relative to the third reference beam (the relative weighting of the dipoles) and a beam shape parameter $\alpha$ which sets the weighting of the first reference beam (the monopole) relative to the second and third reference beams (i.e. relative to the combined dipole).

However, it will be appreciated that in some embodiments, the beam shape parameter and beam direction parameter may be indirect parameters which reflect the beam shape and direction respectively. Thus, the combination may be based on different weight values that may each affect characteristics of both the beam shape and the beam direction. For example, the combination operation may directly use the weights $z_1$, $z_2$, $z_3$. Thus, the beam shape parameter and beam direction parameter need not be used explicitly but may represent virtual, theoretical or indirect parameters that can be derived from the specific physical weight values explicitly used in the combination. Thus, the beam shape parameter and beam direction parameter may be functions of the combination weights.

The combiner is coupled to a cost processor 403 which generates a cost measure from the combined signal. The cost measure is generated as an indication of the energy, and specifically power, of the combined signal. In the specific example, the cost measure is simply calculated as the power of the combined signal:

$$J[k] = y[k]^2$$

It will be appreciated that in many embodiments the cost measure may be determined as a low pass filtered value and may specifically be averaged over a suitable number of samples.

The cost processor 403 is coupled to a minimization processor 405 which is arranged to estimate a beam shape parameter value for the beam shape parameter and a beam direction parameter value for the beam direction parameter that correspond to a local minimum for the cost measure. Thus, the minimization processor 405 determines values of the beam direction parameter and the beam shape parameter which result in the cost function attaining a local minimum. In some scenarios, the local minimum is also a global minimum corresponding to a scenario where the beam shape parameter and the beam direction parameter values are determined to result in the lowest value of the cost measure and thus the lowest power of the combined signal.

In scenarios where there are only two sound sources, the minimum value may often correspond to a complete attenuation of the two sound sources and thus to a zero power of the combined signal. However, in practical scenarios the cost measure will typically be higher due to noise, sound reflections etc.

In the specific case, the minimization processor 405 is further coupled to the combiner 401 and directly controls the beam shape parameter and beam direction parameter values that are used for the combination. Thus, in the example, the minimization of the cost function is achieved by the minimization processor 405 controlling the parameter values that are used to combine the reference beam signals.

It will be appreciated that different approaches for determining the parameter values resulting in a minimum of the cost function may be used. For example, the minimization processor 405 may generate a large set of values of the parameters and provide these to the combiner 401 and may monitor the resulting cost measure.

E.g. for each sample time, the minimization processor 405 may generate a large number of parameter sets comprising a beam shape parameter value and a beam direction parameter value. E.g. all possible sets with values of $\alpha$ from the discrete sequence $0, 0.01, 0.02, 0.03 \ldots 0.99$ and values of $\phi_s$ from the discrete sequence $0, \pi/100, 2\pi/100, 3\pi/100 \ldots 99\pi/100$ may be generated. For each of these sets, the combination may be performed and the cost measure may be calculated. The minimization processor 405 can then search through the cost measure values to find the lowest value. The desired beam shape parameter value and beam direction parameter value are then given as the values for this set.

The minimization processor 405 is coupled to a direction estimator 407 which receives the beam shape parameter value and the beam direction parameter value. The direction estimator 407 proceeds to determine a first direction estimate for a first sound source and a second direction estimate for a second sound source as functions of the received beam shape parameter value and beam direction parameter value.

The direction estimator 407 is specifically based on the fact that the values of the beam shape parameter and the beam direction parameter which result in a minimum of the cost measure will also result in the derivative of the cost function with respect to the beam shape parameter and the beam direction parameter being zero. This fact allows the cost function to be analytically/theoretically analyzed to yield a function expressing the directions of the sound sources as a function of the beam shape parameter and the beam direction parameter. Thus, the direction estimator 407 combines the specific approach of minimizing the specific measured cost measure with the fact that this operation allows an analytical function for the direction estimates to be calculated from the theoretical cost function.

Thus, in the system the first direction estimate and the second direction estimate are calculated as direction estimates which for the beam shape parameter value and the beam direction parameter value correspond to an analytical derivative of the cost function with respect to at least one of the beam shape parameter and the beam direction parameter being zero.

An exemplary analytical derivation will be described in the following for the specific combination of the example, i.e. for $$y[k] = \alpha\, m[k] + (1-\alpha)[\cos(\phi_s) d_x[k] + \sin(\phi_s) d_y[k]]$$

However, it will be appreciated that the same approach can be applied to other combinations and other parameters.

In the example, it is assumed that there exist two distinct sound sources which are located in the azimuthal plane, i.e. in the plane of the microphone array.

The cost function may be defined as:

$$J(\alpha, \phi_s) = \epsilon\{y^2[k]\},$$

where $\epsilon\{\cdot\}$ denotes an average (or low pass filter) operation.

Assuming two directional sources $n_i[k]$ with $i=1,2$ at azimuth angles $\phi_{n_i}$ the combined signal value is given by:

$$y[k] = \sum_{i=1}^{2} E_y(\pi/2, \varphi_{n_i}) n_i[k]$$

$$= \sum_{i=1}^{2} [\alpha + (1-\alpha)\cos(\varphi_{n_i} - \varphi_s)] n_i[k].$$

Assuming that the sound signals are uncorrelated, this yields:

$$J(\alpha, \varphi_s) = \sum_{i=1}^{2} [\alpha + (1-\alpha)\cos(\varphi_{n_i} - \varphi_s)]^2 \sigma_{n_i}^2,$$

with $\sigma_{n_1}^2$ and $\sigma_{n_2}^2$ being the variances of the sources.

The cost function may then be analyzed by differentiation with respect to the beam shape parameter $\alpha$ and the beam direction parameter $\phi_s$ yielding:

$$\frac{\partial J(\alpha, \varphi_s)}{\partial \alpha} = 2\sum_{i=1}^{2}[\alpha(C_i-1)^2 - (C_i-1)C_i]\sigma_{n_i}^2,$$

$$= 2\sum_{i=1}^{2}(C_i-1)^2\left(\alpha - \frac{C_i}{C_i-1}\right)\sigma_{n_i}^2,$$

where $$C_i = \cos(\phi_{n_i} - \phi_s),$$

and $$\frac{\partial J(\alpha, \varphi_s)}{\partial \varphi_s} = 2\sum_{i=1}^{2}[\alpha^2 S_i(C_i-1) + \alpha S_i(1-2C_i) + S_i C_i]\sigma_{n_i}^2,$$

$$= 2\sum_{i=1}^{2} S_i(C_i-1)\left(\alpha - \frac{C_i}{C_i-1}\right)(\alpha-1)\sigma_{n_i}^2,$$

with $$S_i = \sin(\phi_{n_i} - \phi_s).$$

For the local minimum of the cost measure, the derivatives of the cost function will be zero. As can be seen for the above equations, this may be the case if:

$$C_i = 1,$$

which yields $$\phi_{n_1} = \phi_{n_2} = \phi_s.$$

However, such a solution corresponds to a single sound source direction whereas it is assumed that there are two sounds sources present in the scenario. Furthermore, this solution can be shown to be a saddle-point and is accordingly not a stable solution. Accordingly, this solution is ignored.

It can also be seen that the cost function derivatives are zero when $$\alpha = \frac{C_i}{C_i - 1}.$$

This results in $$\alpha = \frac{\cos(\varphi_{n_i} - \varphi_s)}{\cos(\varphi_{n_i} - \varphi_s) - 1},$$

which is satisfied only for $$\varphi_{n_i} = \varphi_s \pm (-1)^i \arccos\left(\frac{\alpha}{\alpha - 1}\right).$$

Thus, the above equation expresses the directions of the sound sources as a function of the beam shape parameter value and the beam direction parameter value for which the cost function is zero. As the cost function is zero for local minima, the beam shape parameter value and the beam direction parameter value determined to result in a minimum of the cost measure accordingly corresponds to parameter values for which the cost function derivatives are zero. Accordingly, these values can be inserted in the above equation to provide the direction estimates for the two sources.

It should be noted that whereas the above equation introduces an ambiguity due to the ± operation, both options are valid. Indeed, the switching between the options merely corresponds to switching the direction estimates between the two sound sources (i.e. a switch between which sound sources the index i relates to).

Thus, the system of FIG. 1 provides efficient direction estimation for two simultaneous sound sources. The approach has been found to provide a highly advantageous performance with accurate results and with low complexity and resource requirements.

In the above specific example, a computationally relatively demanding approach for determining the parameter values corresponding to the minimum of the cost measure was used. In the following a computationally more efficient but highly accurate and reliable approach will be described.

In the following example, a local minimum of the cost measure is specifically determined by an iterative update of the beam shape parameter and the beam direction parameter values. Thus, based on the current values, an update value is determined for each new sample time and is added to the current value to generate the parameter values that are used for the combination of the subsequent sample time. Thus, only one combination result is determined for each sample and based on the current values new parameter values are determined for the subsequent sample time. Thus, the approach may initially not provide the correct parameter values but will converge towards the correct values.

The specific approach uses a gradient search process for both the beam shape parameter and the beam direction parameter but it will be appreciated that a gradient search may in principle be applied to only one of the parameters.

Thus, in the example, the update value is dependent on a derivative value of the cost function. Specifically, the update value for the beam shape parameter is dependent on the value of the derivative of the cost function relative to the beam shape parameter and the update value for the beam direction parameter is dependent on the value of the derivative of the cost function relative to the beam direction parameter.

In more detail, the estimations of the values $\alpha$ and $\varphi_s$, are generated by an adaptive algorithm based on a steepest descent update, where the update step is in the direction opposite to the surface of the cost function. Thus:

$$\hat{\alpha}[k+1] = \hat{\alpha}[k] - \mu \nabla_{\hat{\alpha}} J(\hat{\alpha}, \hat{\varphi}_s),$$

and $$\hat{\varphi}_s[k+1] = \hat{\varphi}_s[k] - \mu \nabla_{\hat{\varphi}_s} J(\hat{\alpha}, \hat{\varphi}_s),$$

where $\hat{}$ denotes estimated values, $\nabla_q$ denotes the gradient with respect to variable q and $\mu$ is a step size controlling the dynamic behavior of the adaptive algorithm.

The derivatives (gradients) may be determined as:

$$\hat{\nabla}_{\hat{\alpha}} J(\hat{\alpha}, \hat{\varphi}_s) = \frac{\partial y^2[k]}{\partial \hat{\alpha}},$$
$$= 2y[k][m[k] - \cos\hat{\varphi}_s d_x[k] - \sin\hat{\varphi}_s d_y[k]],$$

and $$\hat{\nabla}_{\hat{\varphi}_s} J(\hat{\alpha}, \hat{\varphi}_s) = \frac{\partial y^2[k]}{\partial \hat{\varphi}_s},$$
$$= 2y[k](1-\hat{\alpha})[\cos\hat{\varphi}_s d_y[k] - \sin\hat{\varphi}_s d_x[k]],$$

where y[k] as previously described is determined by $$y[k] = \hat{\alpha} m[k] + (1-\hat{\alpha})[\cos\hat{\varphi}_s d_x[k] + \sin\hat{\varphi}_s d_y[k]].$$

Since the gradient computation depends on the energy of the reference beam signals m[k], $d_x[k]$, $d_y[k]$, it is often beneficial to normalize the update equation. This may yield:

$$\hat{\alpha}[k+1] = \hat{\alpha}[k] - \frac{\mu \hat{\nabla}_{\hat{\alpha}} J(\hat{\alpha}, \hat{\varphi}_s)}{\hat{P}_m[k] + \epsilon},$$

and $$\hat{\varphi}_s[k+1] = \hat{\varphi}_s[k] - \frac{\mu \hat{\nabla}_{\hat{\varphi}_s} J(\hat{\alpha}, \hat{\varphi}_s)}{\hat{P}_m[k] + \epsilon},$$

where $\hat{P}_m[k]$ is the power-estimate of the omni-directional response which is included to normalize the adaptation, and $\epsilon$ is a small value to prevent zero division.

It is noted that the approach allows for an independent determination of updated values for the two parameters. In particular, the current update value for one parameter does not depend on the current update value for the other parameter but only on previous values.

This approach may provide a highly efficient approach and the combination of the gradient search with the combination and specific zero derivative based approach for calculating direction estimates results in an accurate approach for determining direction estimates yet maintains low complexity and low computational resource requirements.

As an example, the adaptive algorithm has been simulated for following three sets of source-locations:

| set # | $\varphi_{n1}$ [deg.] | $\varphi_{n2}$ [deg.] | $\hat{\alpha}$ | $\hat{\varphi}_s$ [deg.] |
|---|---|---|---|---|
| 1 | 90 deg. | −135 deg. | 0.2768 | −22.5 |
|   |         |           | −0.6199 | 157.5 |
| 2 | 90 deg. | −90 deg.  | 0 | 0 |
|   |         |           | 0 | 180 |
| 3 | 90 deg. | −45 deg.  | −0.6199 | 22.5 |
|   |         |           | 0.2768 | 202.5 |

It is noted that for each set of sound sources, two optimal solutions for the parameter values are valid (both having a cost function value of zero). One optimal solution is for positive values of $\alpha$ whereas the other is for negative values of $\alpha$. However, both solutions result in the same directional estimates for the two sources.

In the simulations, two uncorrelated Gaussian noise sequence sources with unit variance were used. Also uncorrelated noise was added to the monopole signal and the two orthogonal dipole signals with a variance of 0.0001 for the monopole and 0.000058 for the dipoles (corresponding to a spherical isotropic noise field).

Figure 5:
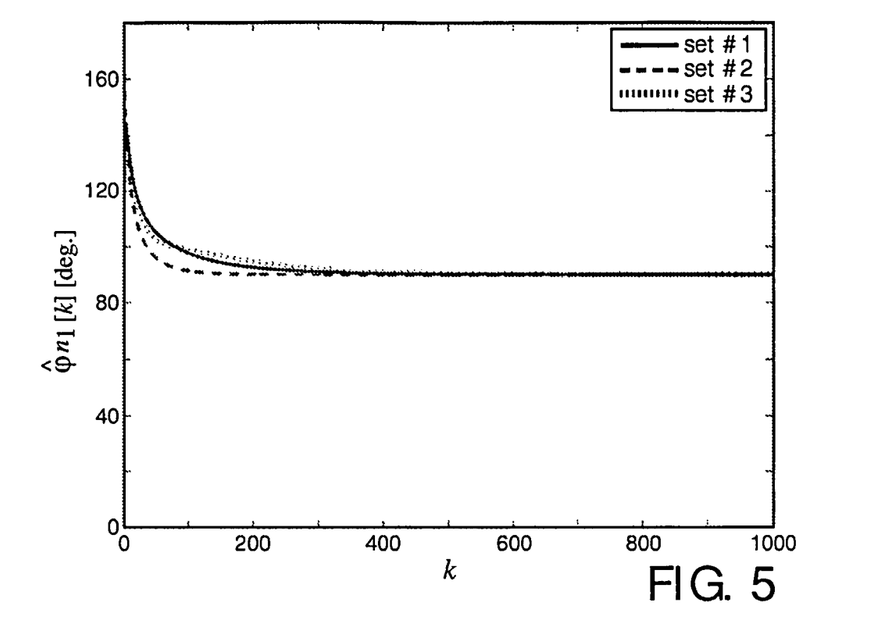
FIG. 5 illustrates an example of direction estimation results generated by the apparatus of claim 1.
Figure 6:
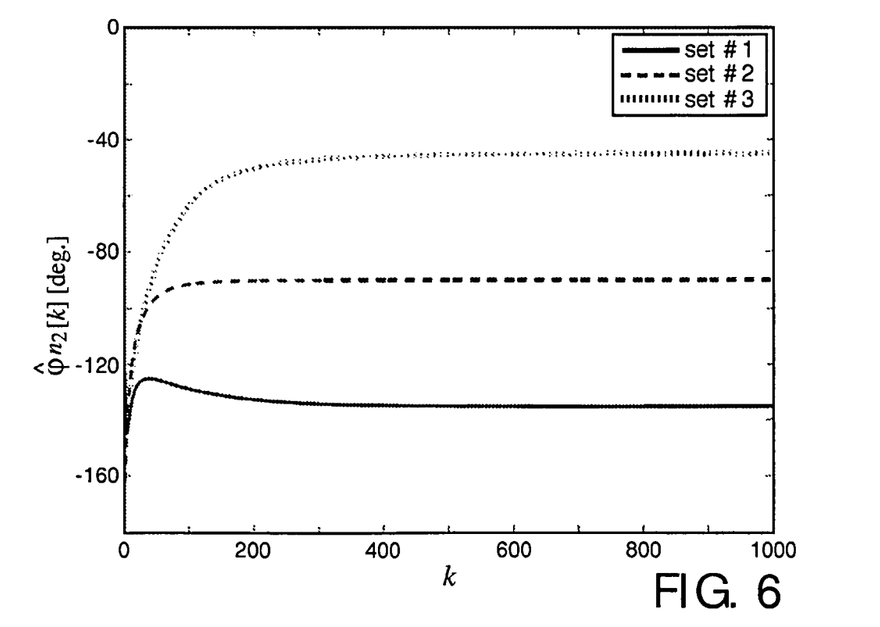
FIG. 6 illustrates an example of direction estimation results generated by the apparatus of claim 1.
Figure 7:
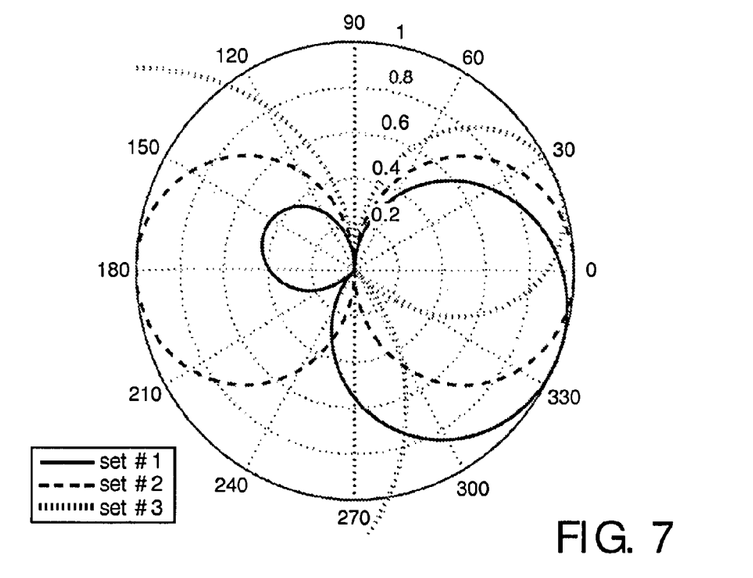
FIG. 7 illustrates an example of audio beams generated by the apparatus of claim 1.
Figure 8:
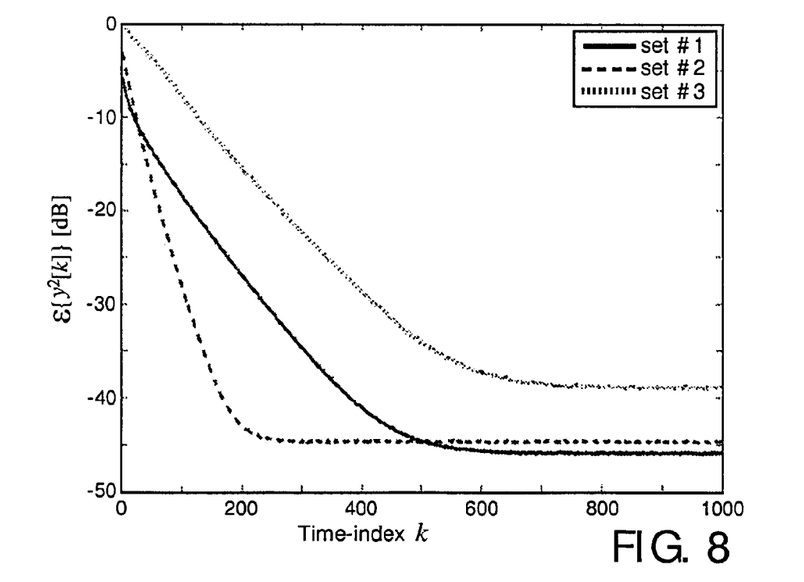
FIG. 8 illustrates an example of a convergence for direction estimates by the apparatus of claim 1.

The ensemble-averaged results (over 10000 independent runs) for the estimated values of the direction estimates $\varphi_{ni}$ are illustrated in FIGS. 5 and 6. The beam patterns corresponding to the combined signals for the three sets of sound sources are illustrated in FIG. 7. As can be seen the nulls are placed at the correct azimuthal angles. Furthermore, it is clear that for Set #1 the shape of the beam pattern is similar to that of Set #3 apart from a scale-factor. This scale-factor is caused by the fact that the beam pattern of Set #1 is constructed from a positive value of $\alpha$ whereas the beam pattern of Set #3 is constructed from a negative value of $\alpha$. For values of $\alpha$ between 0 and 1, the main-lobe of the beam pattern has a unity gain-factor. FIG. 8 illustrates the convergence of the ensemble-averaged cost measure.

In some embodiments, the estimation processor 107 is arranged to limit the beam shape parameter to a reduced operating interval. The interval may specifically restrict the value to result in the maximum weighting of the first reference beam being smaller than the weighting of the combined weighting of the second and third reference beam of the at least three reference beams. In the specific example, this may simply be achieved by requiring that $\alpha < 1/2$.

The restriction of the beam shape value to a weighting of the monopole being smaller than the dipole resulting from the combination of the two individual reference beam dipoles ensures that at least two notches will be present in the azimuthal plane.

In the previous description, it was assumed that the two sound sources were located in the azimuth plane. Specifically, the reference beam equations:

$$E_m = 1$$

$$E_d^x(\theta, \phi) = \cos\phi \sin\theta$$

$$E_d^y(\theta, \phi) = \cos(\phi - \pi/2) \sin\theta.$$

were simplified by assuming the elevation parameter $\theta$ is equal to $\pi/2$ and thus $\sin(\theta)=1$. However, in some embodiments it may be advantageous to take the elevation of sound sources into account. In such a case, the beam shape of the combined signal may be represented by:

$$E_y(\theta, \phi) = \alpha E_m + (1-\alpha)[\cos\phi_s E_d^x(\theta, \phi) + \sin\phi_s E_d^y(\theta, \phi)],$$

Using the Cost Function $$J(\alpha, \phi_s) = \epsilon\{y^2[k]\}$$

with $$y(k) = \sum_{i=1}^{2} E_y(\vartheta_{n_i}, \varphi_{n_i}) n_i[k]$$

$$= \sum_{i=1}^{2} [\alpha + (1-\alpha)\cos(\varphi_{n_i} - \varphi_s)\sin\vartheta_{n_i}] n_i[k].$$

yields $$J(\alpha, \varphi_s) = \sum_{i=1}^{2} [\alpha + (1-\alpha)\cos(\varphi_{n_i} - \varphi_s)\sin\vartheta_{n_i}]^2 \sigma_{n_i}^2,$$

where the elevation angle for each of the sound sources is represented by $\theta_{n_i}$.

Differentiating this function with respect to the beam shape parameter $\alpha$ and the beam direction parameter $\phi_s$ yields:

$$\frac{\partial J(\alpha, \varphi_s)}{\partial \alpha} = 2 \sum_{i=1}^{2} (C_i \sin\vartheta_{n_i} - 1)^2 \left(\alpha - \frac{C_i \sin\vartheta_{n_i}}{C_i \sin\vartheta_{n_i} - 1}\right) \sigma_{n_i}^2,$$

with $$C_i = \cos(\phi_{n_i} - \phi_s),$$

and $$\frac{\partial J(\alpha, \varphi_s)}{\partial \varphi_s} = 2 \sum_{i=1}^{2} \sin\vartheta_{n_i} S_i (C_i \sin\vartheta_{n_i} - 1) \left(\alpha - \frac{C_i \sin\vartheta_{n_i}}{C_i \sin\vartheta_{n_i} - 1}\right) (\alpha - 1) \sigma_{n_i}^2,$$

with $$S_i = \sin(\phi_{n_i} - \phi_s).$$

Thus, the derivative functions correspond to the functions determined for the two dimensional case but modified to take into account the elevation parameter $\theta_{n_i}$. In particular, setting $\theta_{n_i} = \pi/2$ results in the above equations reducing to the ones previously derived.

As before, requiring the derivative to be zero provides an unstable solution corresponding to $$C_i = 1,$$

and thus $$\phi_{n_1} = \phi_{n_2} = \phi_s.$$

Ignoring this solution provides the solution:

$$\varphi_{n_i} = \varphi_s \pm (-1)^i \arccos\left(\frac{\alpha}{\alpha\sin\vartheta_{n_i} - \sin\vartheta_{n_i}}\right).$$

Thus, as can be seen, the requirement of the derivatives being zero results in a corresponding equation for determining the direction estimates from the parameter values as for the two dimensional case (where it is assumed that the sound sources are in the azimuth plane). However, as illustrated, the direction estimates are modified to also be dependent on the elevation. It is noted that the elevation of the sound sources outside the azimuth plane (that of the microphone array) results in the introduction of an error in the two dimensional plane if the previous simplified two dimensional equation is used.

In some embodiments, the two-dimensional direction estimates may therefore be compensated for an elevation of the sound sources outside the plane. As a simple example, a user may manually determine the elevation angle of the potential sources relative to the microphone array and may manually enter the elevation angle. For example, for a conference application where the microphone array is located at the center of a conference table, the elevation angle corresponding to a typical speaking height of people sitting around the table may be determined and fed to the apparatus. This elevation angle is then used as a fixed predetermined calibration value in the above equation.

Such an approach may improve the accuracy of the determined direction estimates. However, it will be appreciated that for many practical applications, the error introduced due to elevation of the sound sources will be insignificant and may simply be ignored.

In some embodiments, the apparatus may further be arranged to generate three-dimensional direction estimate for the two direction estimates. Specifically in addition to the azimuth angle an elevation angle may also be determined.

In some embodiments the reference processor 105 is further arranged to generate a fourth reference beam as a directional beam having a peak gain in a direction which extends out from the plane formed by the peak gains of the second and third reference beams. Such beams may specifically be generated using a three dimensional microphone array. For example, in addition to the three microphones $M_1$, $M_2$, $M_3$ of the x,y plane (ref FIG. 2), the microphone array may further comprise a fourth microphone which is displaced in the z direction, i.e. for which z≠0.

In the specific example, the microphone array may comprise four microphones which are placed at the points of a regular tetrahedron. Thus, a symmetric spherical microphone arrangement may be used. Similar to the planar microphone array, using directional (e.g. cardioid) microphones in the spherical microphone array has the advantage that the sensitivity to sensor noise and sensor-mismatches is greatly reduced.

Figure 9:
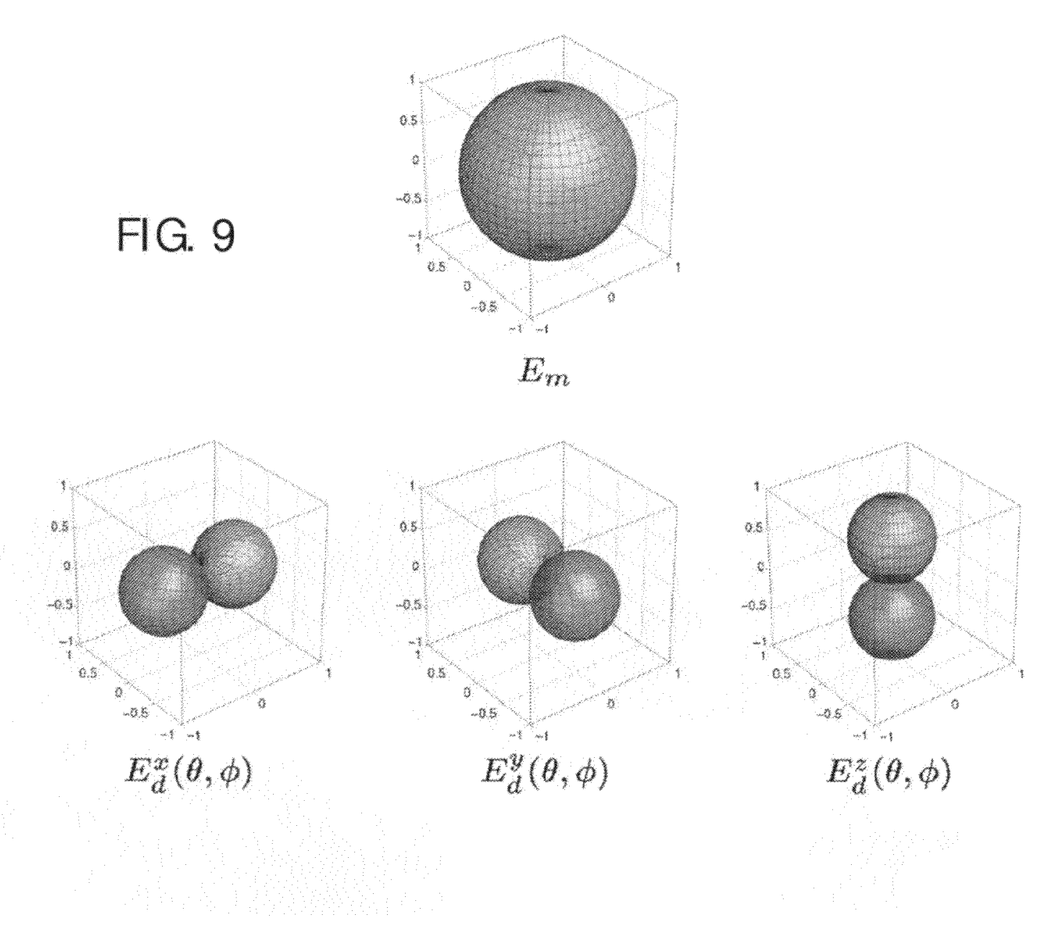
FIG. 9 illustrates an example of Eigenbeams generated by the apparatus of FIG. 1.

Furthermore, in the example the reference processor 105 may combine the signals to generate a fourth reference beam which is a dipole with a similar shape as the dipoles of the second and third reference beams. Specifically, the dipoles may be orthogonal and identical apart from the orientation (direction). Specifically, the reference processor 105 may generate the following reference beams:

$$E_m = 1$$

$$E_d^x(\theta, \phi) = \cos\phi \sin\theta$$

$$E_d^y(\theta, \phi) = \sin\phi \sin\theta$$

$$E_d^z(\theta, \phi) = \cos\theta,$$

where θ is the elevation angle and Φ is the azimuth angle. Thus, in addition to the three reference beams of the previous two dimensional example, a third dipole directed along the z-axis is generated. The reference beams are illustrated in FIG. 9.

The apparatus may then proceed to first perform a two-dimensional direction estimation process as previously described based on the first three reference beams, i.e. based on $E_m$, $E_d^x$ and $E_d^y$.

As demonstrated above, the derivatives are zero when $$\cos(\varphi_{n_i} - \varphi_s) = \frac{\alpha}{(\alpha - 1) \cdot \sin\nu_{n_i}} \cdot (-1)^i$$

Thus, the direction estimation based on the first three reference beams identifies a set of points in the three dimensional space. The above equation specifically defines a set of points corresponding to a periphery of a (rotationally symmetric) cone, where the cone originates from the center of the coordinate system. All sound sources located at points on the periphery of the cone result in zero derivatives. The points of the cone periphery which intersects the x-y plane corresponds to the previous two dimensional estimates.

The apparatus may further proceed to perform the exact same operations based on the first, second and fourth reference beams, i.e. based on $E_m$, $E_d^x$ and $E_d^z$. Thus, a second set of beam shape parameter and beam shape parameter values that result in zero derivates for the cost function are determined for these three reference beams. The processing is equivalent to that for the x-y plane but corresponds to the x-z plane. Thus, the determined beam shape parameter and beam direction parameter values define a second cone of possible sound source localizations.

The apparatus may then proceed to determine the three dimensional estimates based on both processes, and thus based on both the beam shape parameter and beam direction parameter values for the x-y plane and the beam shape parameter and the beam direction parameter values for the x-z plane. Specifically, the x-y plane evaluation results in a first set of three-dimensional points for which the derivative of the cost function for the x-y plane is zero (the first cone) and the x-z plane evaluation results in a second set of three-dimensional points for which the derivative of the cost function for the x-z plane is zero (the second cone). As the sound source positions must meet both requirements, the set of possible sound source positions correspond to the points that are included in both sets of points. Thus, the sets of possible sound source positions correspond to the intersections of the two cones. Hence, the sets of possible sound source positions define two lines in three dimensional space, both originating from the center of the coordinate system.

The selection between the intersecting points may be made based on a requirement that they correspond to a predetermined gain value, i.e. that they are at a specific distance to the center of the coordinate system. Specifically, in the example where all reference beams are unity gain beams, the sound source points may be found by the intersection of the sets of possible sound source positions with the unity sphere. This results in two specific points being determined. The two points $(x_i, y_i, z_i)$ with i=1,2 can be translated into the spherical coordinates:

$$\vartheta_{n_i} = \arccos\left[\frac{z_i}{\sqrt{x_i^2 + y_i^2 + z_i^2}}\right],$$

and $$\varphi_{n_i} = \arctan\left[\frac{y_i}{x_i}\right],$$

where arctan [•] is the four-quadrant arctangent operator.

Thus, the use of a fourth reference beam and equivalent processing in two planes may be used to determine three dimensional direction estimates.

It will be appreciated that the described approach could use any two of the three planes, i.e. the three dimensional direction estimation could alternatively be based on the $E_m$, $E_d^x$, $E_d^y$ and $E_m$, $E_d^y$, $E_d^z$ reference beam sets, or the $E_m$, $E_d^x$, $E_d^z$ and $E_m$, $E_d^y$, $E_d^z$ reference beam sets.

In some embodiments, the algorithm may be performed for all three planes. The direction estimation may then be based on the two planes for which the difference between the estimated angles in the plane is the largest. This because we know that the adaptive behavior of the algorithm becomes worse when the difference between the angles of the two sources (observed in the respective plane) becomes small (e.g. when α comes close to ½). Hence, we select the two planes, where α/(α−1) is most close to 0 (zero).

It will be appreciated that the direction estimates may be used advantageously in many scenarios and for many applications. For example, it may form the basis of sound source separation which e.g. may be used directional beams or zeroes that are steered in response to the directional estimates. For example, two beams may be formed in the estimated directions of the sound sources (when the sound sources represent wanted signals) or two zeroes may be formed in the estimated directions of the sound sources (when the sound sources represent undesired signals) using any suitable beam-forming technique.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate circuits, processors or controllers may be performed by the same circuit, processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

The term circuit, processor, controller etc does not imply a specific construction or implementation but may be implemented in any suitable fashion. Specifically, a circuit may e.g. be a processing algorithm implemented as an executable code on a suitable processor.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor.

Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An audio source localization apparatus comprising:
    a receiving circuit for receiving microphone signals from an at least two-dimensional microphone array comprising at least three microphones;
    a reference circuit for generating signals of at least three reference beams from the microphone signals, the three reference beams having different directional properties; and
    an estimation circuit for generating a simultaneous direction estimate for two sound sources, the estimation circuit comprising:
        a circuit for generating a combined signal by combining the signals of the at least three reference beams, the combined signal having a beam shape parameter reflecting a shape of an audio beamform for the combined signal and a beam direction parameter reflecting a direction of an audio beamform for the combined signal,
        a circuit for generating a cost measure indicative of an energy measure of the combined signal,
        a circuit for estimating a beam shape parameter value for the beam shape parameter and a beam direction parameter value for the beam direction parameter corresponding to a local minimum for the cost measure, and
        a circuit for determining a first direction estimate of a first sound source and a second direction estimate for a second sound source as functions of the beam shape parameter value and the beam direction parameter value.

2. The audio source localization apparatus as claimed in claim 1, wherein the estimation circuit is arranged to iteratively determine an update value for at least a first parameter of the beam shape parameter and the beam direction parameter in response to the combined signal, a current value of the beam shape parameter and a current value of the beam direction parameter, and to generate a new value for the first parameter from the update value and a current value of the first parameter.

3. The audio source localization apparatus as claimed in claim 2, wherein the update value is dependent on a derivative value of the cost measure with respect to the first parameter.

4. The audio source localization apparatus as claimed in claim 2, wherein the estimation circuit is arranged to independently determine update values for both the beam shape parameter and the beam direction parameter.

5. The audio source localization apparatus as claimed in claim 1, wherein the estimation circuit is arranged to estimate the local minimum using a gradient search process for at least one of the beam shape parameter and the beam direction parameter.

6. The audio source localization apparatus as claimed in claim 1, wherein the estimation circuit is arranged to limit the beam shape parameter to values for which a maximum weighting of a first reference beam of the at least three reference beams being smaller than a combined weighting of a second and third reference beam of the at least three reference beams.

7. The audio source localization apparatus as claimed in claim 1, wherein the first direction estimate and the second direction estimate are two-dimensional direction estimates in a plane and the estimation circuit is arranged to compensate the first direction estimate and the second direction estimates for an elevation of the source outside the plane.

8. The audio source localization apparatus as claimed in claim 1, wherein the microphone array is a three-dimensional microphone array comprising at least four microphones;
    the reference circuit is arranged to further generate a signal of a fourth reference beam, and in the estimation circuit:
        the circuit for generating the combined signal generating a further combined signal by combining signals of the fourth reference beam and at least two other reference beams of the at least three reference beams, the further combined signal having a further beam shape parameter reflecting a shape of an audio beamform for the further combined signal and a further beam direction parameter reflecting a direction of a further audio beamform for the further combined signal,
        the circuit for generating the cost measure generating a further cost measure indicative of an energy measure of the further combined signal, and the circuit for estimating the beam shape parameter value generating a further beam shape parameter value for the further beam shape parameter and a further beam direction parameter value for the beam direction parameter corresponding to a local minimum for the further cost measure; and the circuit for determining the first direction estimate and the second direction estimate is arranged to further determine the first direction estimate and the second direction estimate in response to the further beam shape parameter value and the further beam direction parameter value.

9. The audio source localization apparatus as claimed in claim 8, wherein:

the beam shape parameter value and the beam direction parameter value characterize a first set of three-dimensional points for which a derivative of the cost measure with respect to at least one of the beam shape parameter and the beam direction parameter is zero;

the further beam shape parameter value and the further beam direction parameter characterize a second set of three-dimensional points for which a derivative of the further cost measure with respect to at least one of the further beam shape parameter and the further beam direction parameter is zero; and the estimation circuit is arranged to determine the first direction estimate and the second direction estimate as direction estimates for at least two three-dimensional points comprised in both the first set of three-dimensional points and the second set of three-dimensional points.

10. The audio source localization apparatus as claimed in claim 9, wherein the estimation circuit is arranged to select the at least two three-dimensional points in response to a requirement that the at least two three-dimensional points correspond to a predetermined gain value.

11. The audio source localization apparatus as claimed in claim 1, wherein the estimation circuit is arranged to determine the first direction estimate and the second direction estimate as direction estimates which for the beam shape parameter value and the beam direction parameter value for which an analytical derivative of the cost function with respect to at least one of the beam shape parameter and the beam direction parameter is zero.

12. The audio source localization apparatus as claimed in claim 1, wherein a first reference beam of the at least three reference beams is a monopole and at least a second reference beam and a third reference beam of the at least three reference beams are differently directed dipoles.

13. The audio source localization apparatus as claimed in claim 11, wherein the beam direction parameter is indicative of a weighting of the second reference beam relative to the third reference beam, and the beam shape parameter is indicative of a weighting of the first reference beam relative to the second and third reference beams.

14. The audio source localization apparatus as claimed in claim 1, wherein the combination is substantially given by:

$$y[k] = \alpha\, m[k] + (1-\alpha)\,[\cos(\phi_s)d_x[k] + \sin(\phi_s)d_y[k]]$$

where y[k] represents sample k of the combined signal, m[k] represents sample k of the first reference beam, $d_x[k]$ represents sample k of the second reference signal, $d_y[k]$ represents sample k of the third reference signal, $\alpha$ is the beam shape parameter and $\phi_s$ is the beam direction parameter.

15. A method of audio source localization comprising:

receiving microphone signals from an at least two-dimensional microphone array comprising at least three microphones;

generating signals of at least three reference beams from the microphone signals, the three reference beams having different directional properties; and generating a simultaneous direction estimate for two sound sources by performing the steps of:

generating a combined signal by combining the signals of the at least three reference beams, the combined signal having a beam shape parameter reflecting a shape of an audio beamform for the combined signal and a beam direction parameter reflecting a direction of an audio beamform for the combined signal, generating a cost measure indicative of an energy measure of the combined signal, estimating a beam shape parameter value for the beam shape parameter and a beam direction parameter value for the beam direction parameter corresponding to a local minimum for the cost measure, and determining a first direction estimate of a first sound source and a second direction estimate for a second sound source as functions of the beam shape parameter value and the beam direction parameter value.

* * * * *